(12) United States Patent
Adams et al.

(10) Patent No.: US 7,262,934 B2
(45) Date of Patent: Aug. 28, 2007

(54) LIMIT STOP FILTER SUPPORT APPARATUS

(75) Inventors: Carl Fred Adams, Lakeville, MN (US); Steve Scott Eckerd, Savage, MN (US); Cory Bert Welscher, Belle Plaine, MN (US); Alan Hing-Bun Tsang, Minneapolis, MN (US); Jackson Wagner Nichols, Belle Plaine, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 628 days.

(21) Appl. No.: 10/862,673

(22) Filed: Jun. 7, 2004

(65) Prior Publication Data

US 2005/0270692 A1 Dec. 8, 2005

(51) Int. Cl.
*G11B 17/02* (2006.01)
(52) U.S. Cl. .................................. 360/97.02
(58) Field of Classification Search ............. 360/97.01, 360/97.02, 97.04, 97.03, 244.8
See application file for complete search history.

(56) References Cited

U.S. PATENT DOCUMENTS

| | | | |
|---|---|---|---|
| 4,857,087 A | 8/1989 | Bolton | |
| 5,101,305 A * | 3/1992 | Ohkita et al. ............. | 360/97.02 |
| 5,602,700 A | 2/1997 | Viskochil | |
| 5,768,058 A | 6/1998 | Hofland | |
| 6,097,569 A | 8/2000 | Haruyama | |
| 6,208,484 B1 | 3/2001 | Voights | |
| 6,342,991 B1 | 1/2002 | Joshi | |
| 6,369,977 B1 | 4/2002 | Imai | |
| 6,600,625 B1 * | 7/2003 | Munninghoff et al. ... | 360/97.02 |
| 6,600,626 B2 | 7/2003 | Shimizu et al. | |
| 7,006,324 B1 * | 2/2006 | Oveyssi et al. .......... | 360/97.02 |
| 7,130,149 B2 * | 10/2006 | Hong et al. .............. | 360/97.02 |
| 7,130,150 B2 * | 10/2006 | Ng et al. .................. | 360/97.02 |
| 2002/0075590 A1 | 6/2002 | Garikpati | |
| 2003/0210492 A1 * | 11/2003 | Adams et al. ........... | 360/97.02 |
| 2004/0252406 A1 * | 12/2004 | Sorrell et al. ............ | 360/97.02 |
| 2005/0063092 A1 * | 3/2005 | Xu et al. .................. | 360/97.02 |

* cited by examiner

*Primary Examiner*—Allen Cao
(74) *Attorney, Agent, or Firm*—Randall K. McCarthy

(57) ABSTRACT

A limit stop filter support apparatus for use in controlling fluidic currents and limiting movement of an actuator within a housing, such as in a data storage device. First and second filter retention members extend from a filter support base to confine opposing ends of a filter used to filter fluidic currents within the housing, and a cantilevered limit stop extends from the base to contactingly limit movement of an actuator moveable within the housing. The limit stop preferably comprises a spring member supporting a latch member, the latch member selectively confining the actuator in a parked position. The first and second retention members each preferably include a shroud surface adjacent an outer peripheral edge of a rotatable storage medium to direct the fluidic currents established by rotation of the medium.

17 Claims, 2 Drawing Sheets

LIMIT STOP FILTER SUPPORT APPARATUS

FIELD OF THE INVENTION

The claimed invention relates generally to data storage devices and more particularly, but without limitation, to an apparatus which controls recirculating fluidic currents established during active operation of a data storage device and selectively limits travel of an actuator of the device during periods of inactivity.

BACKGROUND

Disc drives are digital data storage devices which store and retrieve large amounts of user data in a fast and efficient manner. The data are recorded on the surfaces of one or more rigid data storage discs affixed to a spindle motor for rotation at a constant high speed.

One or more data transducing heads are controllably positioned by an actuator to read data from and write data to tracks defined on the recording surfaces. The heads are configured to be hydrodynamically supported over the recording surfaces by fluidic currents established by the high speed rotation of the discs.

It is desirable to control the flow of the fluidic currents within a disc drive housing and to filter particulates from the currents. Particles can increase the chances to induce undesired and potentially catastrophic contact between the heads and the discs of the data storage device. Additionally, controlling the flow of the fluidic currents promotes a desirable reduction of turbulence in the vicinity of the heads. Turbulence can induce undesired vibrations in the heads, thereby adversely affecting data reading and writing performance.

In providing effective filtering and air flow control, disc drive designers are constrained by a number of factors, including continually reduced form factors and internal clearance issues. Thus, with the continued demand for higher performance data storage devices, there remains a continual need for improved approaches to controlling and filtering recirculating fluidic currents within such devices. It is to such improvements that the claimed invention is directed.

SUMMARY OF THE INVENTION

In accordance with preferred embodiments, a limit stop filter support apparatus includes first and second filter retention members respectively extending from a filter support base to confine opposing ends of a filter used to filter fluidic currents within a housing. A cantilevered limit stop extends from the filter support base to contactingly limit movement of an actuator moveable within the housing.

The limit stop preferably comprises a spring member supporting a latch member, the latch member selectively confining the actuator in a parked position. The first and second retention members each preferably include a shroud surface adjacent an outer peripheral edge of a rotatable storage medium to direct the fluidic currents established by rotation of the medium.

In accordance with further preferred embodiments, a data storage device is provided which includes a rotatable storage medium which establishes recirculating fluidic currents during rotation, an actuator which controllably moves a data transducing head adjacent a surface of the medium, and a limit stop filter support.

The limit stop filter support includes a base from which extend first and second filter retention members and a cantilevered limit stop, the first and second retention members confining opposing ends of a filter used to filter said fluidic currents, the limit stop contactingly limiting movement of the actuator.

These and various other features and advantages which characterize the claimed invention will become apparent upon reading the following detailed description and upon reviewing the associated drawings.

DETAILED DESCRIPTION

Figure 1:
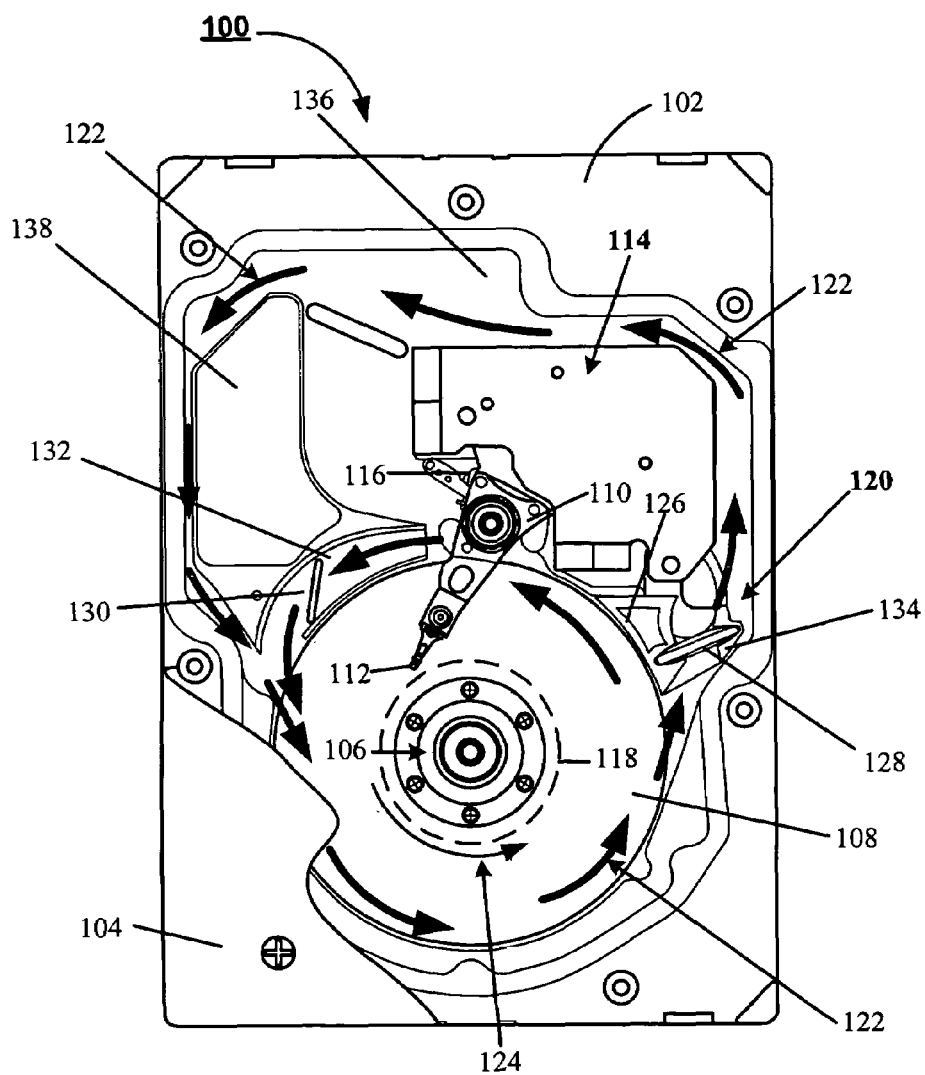
FIG. 1 is a partial cut-away plan view of a data storage device incorporating a limit stop filter support apparatus constructed in accordance with preferred embodiments of the present invention.

FIG. 1 provides a top plan view of a data storage device (DSD) 100 constructed in accordance with preferred embodiments of the present invention. A base deck 102 and a top cover 104 (shown in partial cut-away) cooperate to form an environmentally controlled housing for the DSD 100.

A spindle motor 106 rotates a number of magnetic recording discs 108 at a constant, high speed. A rotary actuator 110 controllably moves a corresponding number of data transducing heads 112 across recording surfaces of the discs 108 through application of current to a voice coil motor assembly (VCM) 114.

The heads 112 are aerodynamically supported over the recording surfaces by fluidic recirculating currents established by rotation of the discs 108. For purposes of the present discussion, it will be contemplated that the DSD 100 includes two discs 108 and four heads 112, although other numbers of discs and heads can be used as desired.

A flex circuit assembly 116 provides electrical communication paths between the actuator 110 and a disc drive printed circuit board (PCB) mounted to the underside of the base deck 102. Preferably, when the DSD 100 is deactivated, the PCB commands the actuator 110 to position and bring the heads 112 to rest on texturized landing zones 118 near the innermost diameters of the discs 108. By positioning the heads 108 on the texturized landing zones 118, the actuator 110 is contactingly engaged with a limit stop filter support apparatus 120, which preferably confines the actuator 110 in a parked position as described below.

Vectors of airflow 122 indicate the direction of flow of fluidic currents developed by rotation of the discs 108 in a direction shown by rotational direction vector 124. As the fluidic current progresses around the disc, a shroud portion 126 of the apparatus 120 directs a portion of the flow through a secondary filter 128, while another portion of the flow is directed through a primary filter 130, confined within a shroud channel 132. The secondary filter 128 is preferably supported and confined by a filter feature portion 134 of the apparatus 120.

In addition to diverting a portion of the flow, the shroud portion 126 reduces wind resistance encountered by the disc 108 during rotation. The flow diverted by the shroud portion 126 through the secondary filter 128 continues to progress through a bypass channel 136, and into contact with a desiccant chamber 138, which extracts humidity from the flow. The apparatus 120 is preferably mounted to the base deck 102 during disc drive manufacturing after a head-disc merge operation wherein the heads 112 are loaded onto the discs 108.

As will be recognized, a head-disc merge operation generally entails affixing the actuator 110 to the base deck 102 with the heads 112 beyond the outermost diameters of the discs 108, and then rotating the actuator 110 to advance the heads 112 to the landing zones 118. The apparatus 120 is mounted to the base deck as a top down assembly process step. Once the spindle motor 106 supporting the discs 108 and actuator 110 supporting the heads 112 have been affixed to the base deck 102, the apparatus 120 is secured to the base deck 102.

Figure 2:
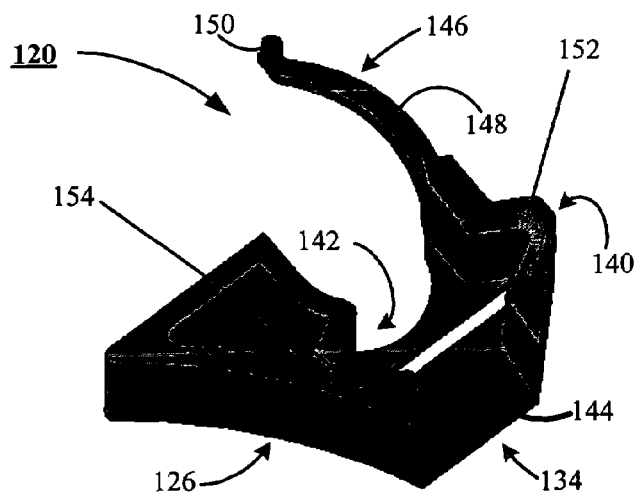
FIG. 2 shows a top perspective view of the limit stop filter support apparatus of FIG. 1.

As shown by FIG. 2, the filter feature portion 134 of the apparatus 120 includes an outer filter retention member 140 and an inner filter retention member 142 (also referred to herein as first and second filter retention members). The members 140, 142 are respectively supported by a filter support base 144 and are configured to support opposing ends of the filter 128. The aforementioned shroud portion 126 is supported by the inner filter retention member 142, as shown. The outer filter retention member 140 can further be provided with a similar shroud portion, as desired, depending on the requirements of a given application.

Adjacent the outer filter retention member 140 and cooperating with the filter support base 144 is an outer stop portion 146. The outer stop portion 146 includes a spring member 148 with a proximal end communicating with the filter support base 144. The outer stop portion further has an actuator latch member 150 supported on a distal end of the spring member 148.

The actuator latch member 150 captures a corresponding latch feature of the actuator 110 when the DSD 100 positions the heads 112 adjacent the landing zones 118. This serves to place the actuator 110 in a parked position while data transfer operations are suspended during a period of inactivity. Preferably, the apparatus 120 is formed using a suitable injection molding operation from a durable polymer such as a polycarbonate resin, but may be formed from other moldable, rigid polymers, or materials such as engineered ceramics.

FIG. 2 also shows the outer filter retention member 140 provides an outer filter retention channel 152, and the inner filter retention member 142 provides an inner filter retention channel 154, wherein fluidic currents developed by rotation of the disc 108 (of FIG. 1) of the DSD 100 are substantially sealed from migration around the secondary filter 128 (of FIG. 1) and passed through the secondary filter 128.

Figure 3:
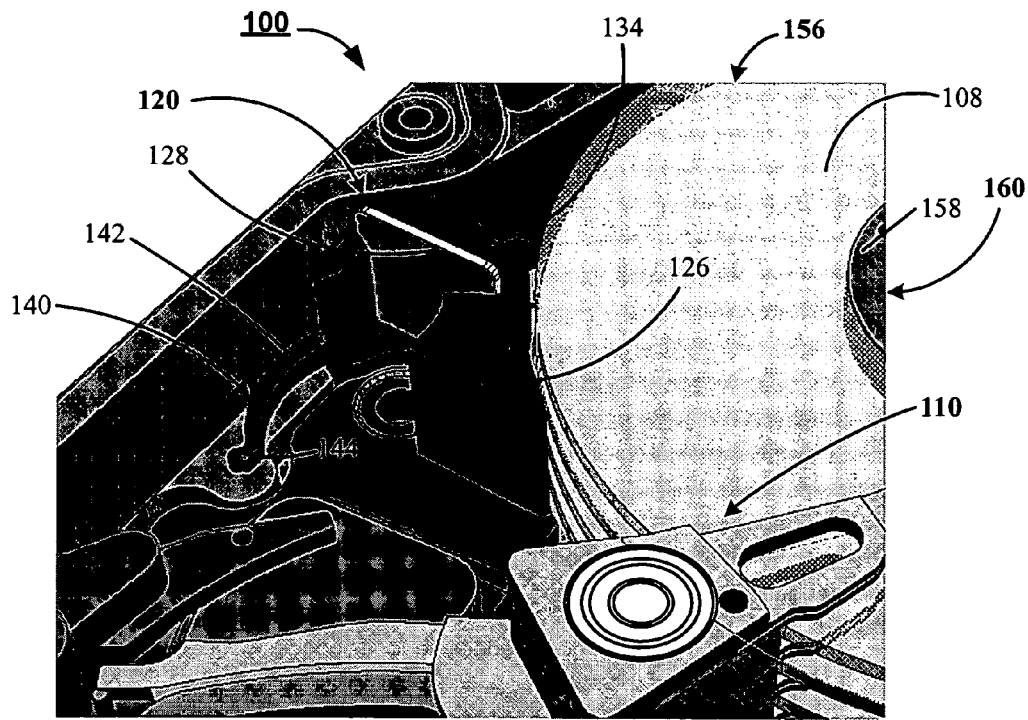
FIG. 3 shows the limit stop filter support apparatus in greater detail.

FIG. 3 shows a disc stack assembly 156 formed from a number of discs 108 stacked on the spindle motor 106 and clamped thereto by a disc clamp 158. The disc stack assembly 156 and the actuator 110 in combination collectively form mechanically active components (MAC) 160 of the DSD 100. During data exchange operations of the DSD 100, the MAC 160 generates sub-micron particles and dislodges sub-micron particles from other components internal to the DSD 100.

Empirical data shows that operating the DSD 100 with the primary filter 130 alone, a cleanup time of about 42 seconds is consistently achieved. However, with the addition of the OSFF 120 to the DSD 100, the cleanup time dropped and a cleanup time of about 13 seconds is consistently achieved.

To measure cleanup time, at spin-up of the DSD 100, a continuous sample of the fluidic currents generated by the spinning disc 108 is provided to a particle counter (not shown). The particle counter records a presence and number of particles of substantially 0.3 microns (and greater) present in the sampled fluidic currents.

At spin-up of the disc stack assembly 156, the particle counter registers a start time and measures an elapse time from spin-up to achieve an absence of particles in the sampled fluidic currents. By cycling the fluidic currents through the primary and secondary filters, 130 and 128 respectively (of FIG. 1), particles are extracted from the fluidic currents. Additionally, over the life of the DSD 100, the primary and secondary filters, 130 and 128 respectively, continue to extract particles from the fluidic currents generated during operation of the DSD 100. An ability of the DSD 100 to continually self-clean during operation of the MAC 160 reduces a probability of particle induced catastrophic failure of the DSD 100. By reducing the cleanup time; the probability of particle induced catastrophic failure of the DSD 100 is further reduced.

Figure 4:
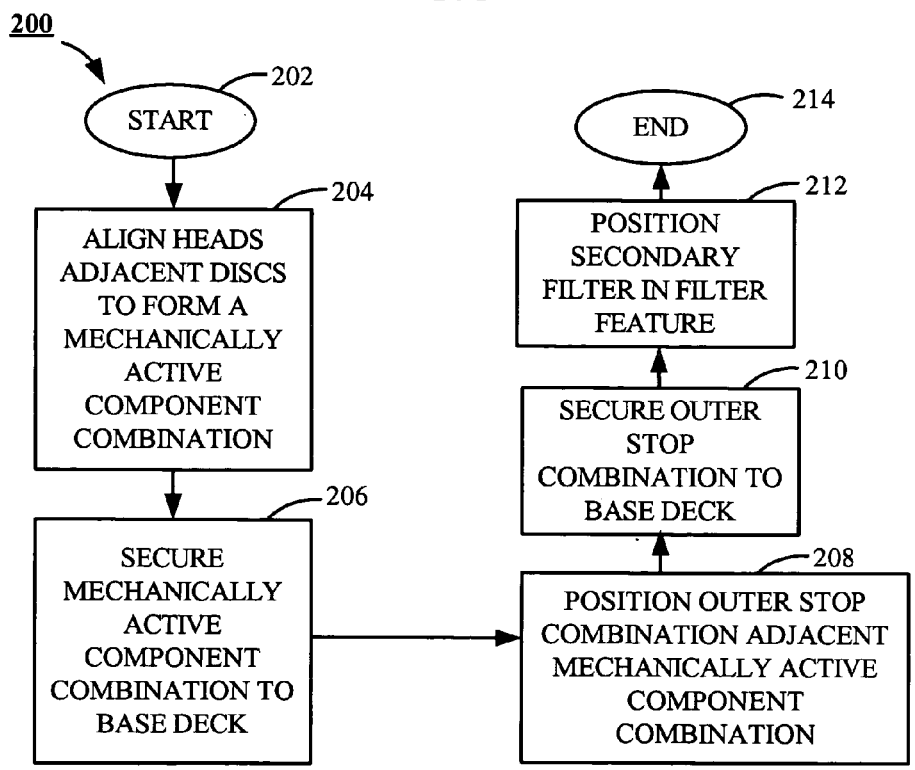
FIG. 4 illustrates a flow chart for a preferred method of assembling the disc drive of FIG. 1.

FIG. 4 shows a flow chart 200 of steps included within a preferred method of forming the DSD 100. The method commences at start process step 202, and continues at process step 204 where the transducing heads 112 are aligned adjacent the corresponding discs 108 to form the mechanically active component combination 160. At process step 206, the MAC 160 is secured to the base deck 102. At process step 208, the limit stop filter support apparatus 120 is positioned adjacent the MAC 160 and at process step 210, the apparatus 120 is secured to a base surface of the base deck 102. At process step 212, the filter 128 is positioned within and confined by the filter feature portion 134, after which the process ends at step 214.

In view of the foregoing, it will now be appreciated that the present invention, as embodied herein and as claimed below, is generally directed to a limit stop filter support apparatus (such as 120).

In accordance with preferred embodiments, the apparatus includes first and second filter retention members (such as 140, 142) respectively extending from a filter support base (such as 144) to confine opposing ends of a filter (such as 128) used to filter fluidic currents within a housing (such as 102, 104). A cantilevered limit stop (such as 146) extends from the filter support base to contactingly limit movement of an actuator moveable within the housing.

It is to be understood that even though numerous characteristics and advantages of embodiments of the present invention have been set forth in the foregoing description, together with details of the structure and function of embodiments of the invention, this detailed description is illustrative only, and changes may be made in detail, especially in matters of structure and arrangements of parts within the principles of the present invention to the full extent indicated by the broad general meaning of the terms wherein the appended claims are expressed. For example, the particular elements may vary depending on the particular application of the combination outer stop with shrouding and filter features without departing from the spirit and scope of the present invention.

In addition, although the embodiments described herein are directed to a combination outer stop with shrouding and filter features for a data storage device, it will be appreciated by those skilled in the art that the combination outer stop with shrouding and filter features can be used for other types of storage devices, including optical drives and magneto-optical drives, without departing from the spirit and scope of the claimed invention.

What is claimed is:

1. An apparatus, comprising:
   a filter support base;
   first and second filter retention members respectively extending from the filter support base and configured to confine opposing ends of a filter used to filter fluidic currents within a housing; and
   a cantilevered limit stop extending from the filter support base to contactingly limit movement of an actuator moveable within the housing.

2. The apparatus of claim 1, wherein the limit stop comprises a spring member supporting a latch member, the latch member selectively confining the actuator in a parked position.

3. The apparatus of claim 1, wherein the first and second retention members each define a respective filter retention channel adapted to retain a selected one of the opposing ends of the filter.

4. The apparatus of claim 1, wherein the first retention member further comprises a shroud surface configured for placement adjacent an outer peripheral edge of a rotatable disc within the housing, and wherein said fluidic currents are established by rotation of said disc.

5. The apparatus of claim 4, wherein the second retention member further comprises a second shroud surface configured for placement adjacent the outer peripheral edge of the rotatable to additionally control said fluidic currents.

6. The apparatus of claim 1, wherein the base and the respective first and second retention members cooperate to form a channel through which fluidic currents are directed to pass through said filter.

7. The apparatus of claim 1, wherein the housing is characterized as a housing of a data storage device, and wherein the actuator supports a data transducer adjacent a data storage medium.

8. The apparatus of claim 1, wherein the filter support base, first and second filter retention members and the limit stop are injection molded to form an integral article.

9. A data storage device, comprising:
   a rotatable storage medium which establishes recirculating fluidic currents during rotation;
   an actuator which controllably moves a data transducing head adjacent a surface of the medium; and
   a limit stop filter support comprising a base from which extend first and second filter retention members and a cantilevered limit stop, the first and second retention members confining opposing ends of a filter used to filter said fluidic currents, the limit stop contactingly limiting movement of the actuator.

10. The data storage device of claim 9, further comprising an enclosed housing in which the storage medium, actuator and limit stop support are disposed, the housing having an internal base surface which supports the base of the limit stop filter support.

11. The data storage device of claim 9, wherein the limit stop comprises a spring member supporting a latch member, the latch member selectively confining the actuator in a parked position.

12. The data storage device of claim 9, wherein the first and second retention members each define a respective filter retention channel adapted to retain a selected one of the opposing ends of the filter.

13. The data storage device of claim 9, wherein the first retention member further comprises a shroud surface configured for placement adjacent an outer peripheral edge of a rotatable disc within the housing, and wherein said fluidic currents are established by rotation of said disc.

14. The apparatus of claim 13, wherein the second retention member further comprises a second shroud surface configured for placement adjacent the outer peripheral edge of the rotatable to additionally control said fluidic currents.

15. The data storage device of claim 9, wherein the base and the respective first and second retention members cooperate to form a channel through which fluidic currents are directed to pass through said filter.

16. The data storage device of claim 9, wherein the filter support base, first and second filter retention members and the limit stop are injection molded to form an integral article.

17. An apparatus comprising an actuator adjacent a rotatable disc, and means for directing fluidic currents developed by disc rotation and for limiting actuator travel.

* * * * *